Sept. 10, 1963    A. WEIGEL    3,103,241
STRAW CHOPPER AND BLOWER
Filed Feb. 23, 1962    2 Sheets-Sheet 1
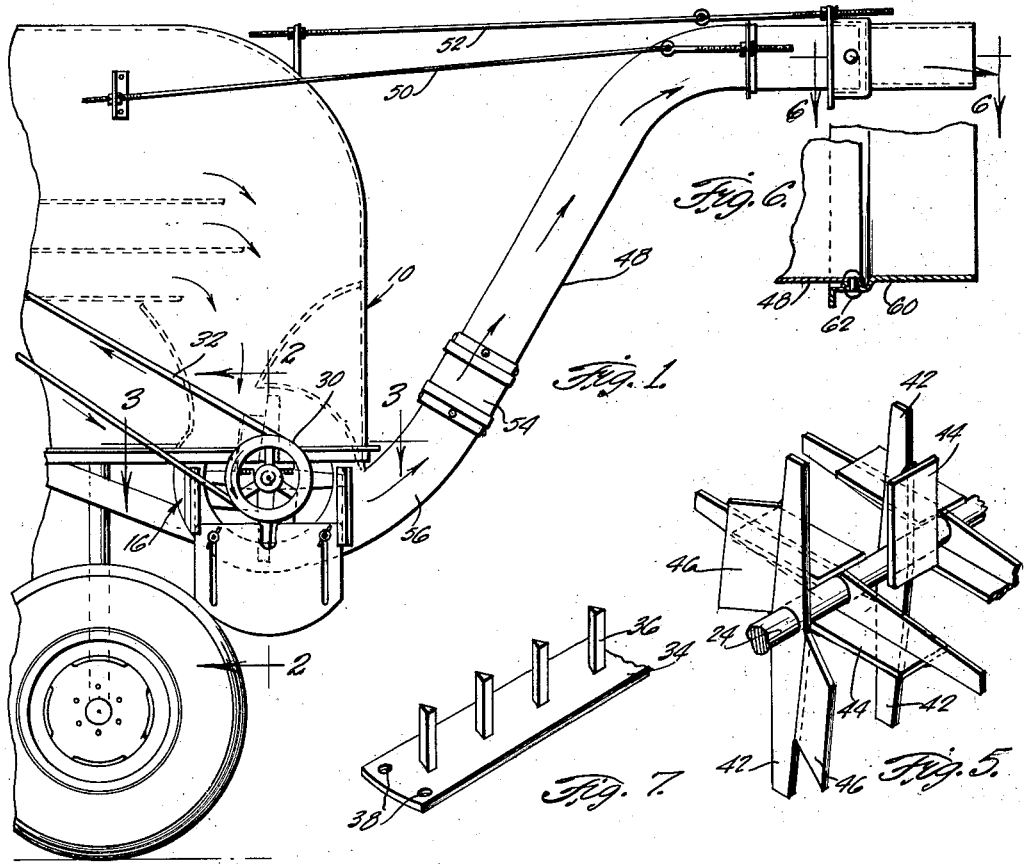
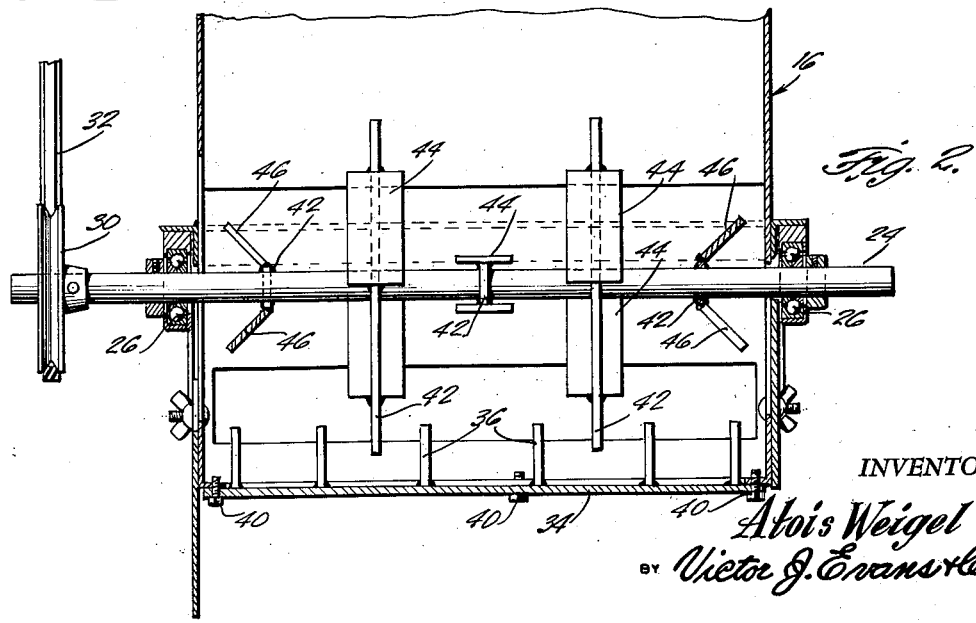
INVENTOR.
Alois Weigel
BY Victor J. Evans & Co.
ATTORNEYS

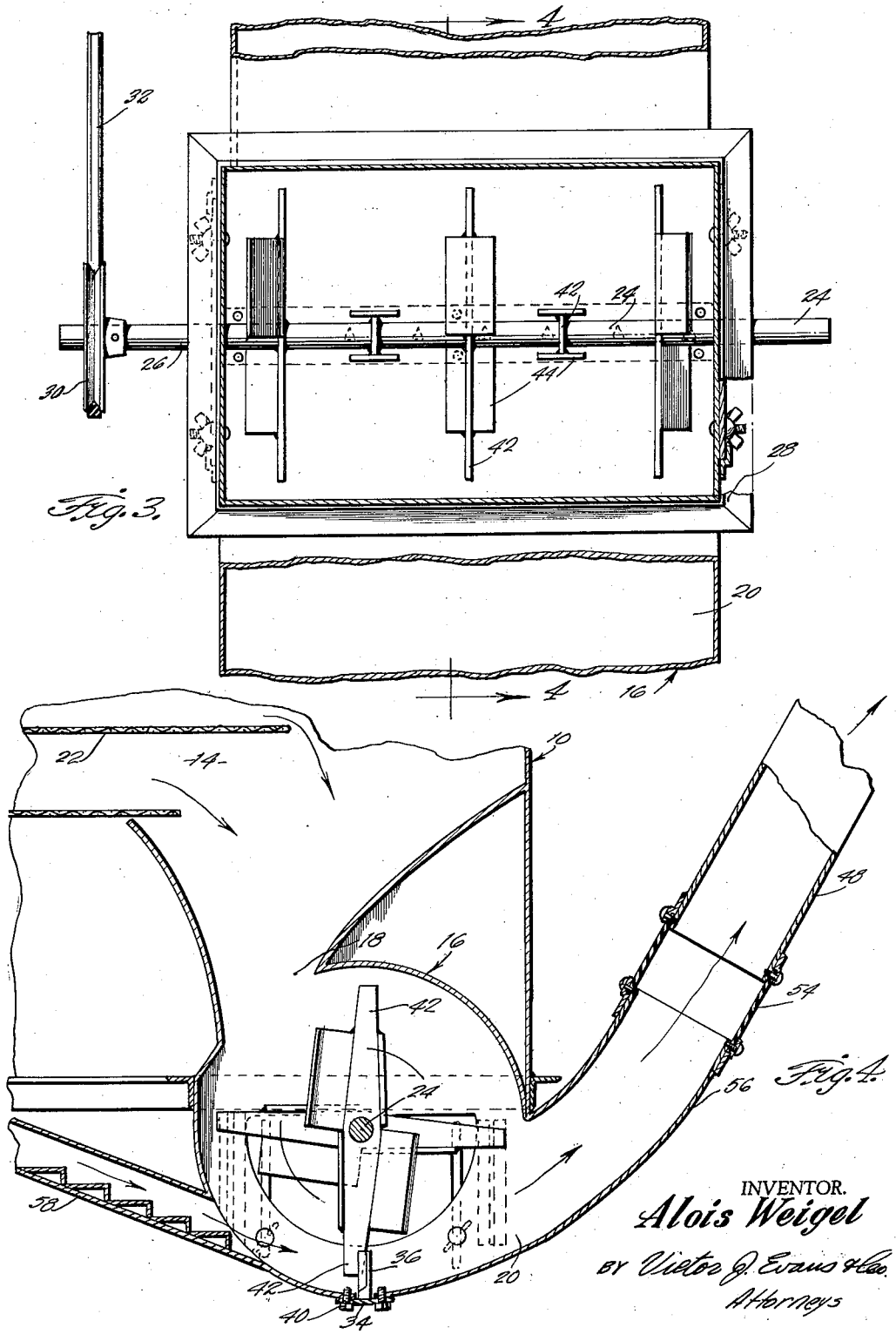

United States Patent Office 3,103,241
Patented Sept. 10, 1963

3,103,241
STRAW CHOPPER AND BLOWER
Alois Weigel, Napoleon, N. Dak.
Filed Feb. 23, 1962, Ser. No. 175,196
1 Claim. (Cl. 146—107)

The present invention relates to harvester threshers or combines generally and in particular to a straw chopper and blower for attachment to a thresher or combine. Presently in use are harvester threshers or combines which are employed to cut and thresh small grains and to deliver the cleaned grain to a truck or wagon traveling along with the thresher or combine. The chaff and straw is delivered back onto the ground for plowing under. If the straw is to be used for another purpose such as bedding for livestock, it must be raked from the field, bailed, or gathered loose and taken to a place of storage.

An object of the present invention is to provide a straw chopper and blower which chops the straw as it is delivered from a combined or thresher and blows it into a wagon or truck moving along with the combine or thresher.

Another object of the present invention is to provide a straw chopper and blower which will not clog up due to weeds in the straw, one which has replaceable abutment teeth against which the straw is thrown for chopping, one which can be manufactured at reasonable cost and from common materials available to the farmer, and one which is highly efficient in action.

A further object of the present invention is to provide a straw chopper and blower which may be adapted for use with any type of threshing machine or harvester combine.

These and other objects and advantages of the present invention will be fully apparent from the following description when taken in connection with the annexed drawings, in which:

FIGURE 1 is an elevational view of the rear portion of a thresher, showing the device of the present invention installed thereon, FIGURE 2 is a view on an enlarged scale, taken on the line 2—2 of FIGURE 1, FIGURE 3 is a view on an enlarged scale, taken on the line 3—3 of FIGURE 1, FIGURE 4 is a view taken on the line 4—4 of FIGURE 3, FIGURE 5 is a perspective view of a portion of the blade and fan assembly of the device of the present invention, FIGURE 6 is a view taken on the line 6—6 of FIGURE 1, and FIGURE 7 is a perspective view of the abutment teeth and supporting plate removed from the device of the present invention, a portion of the plate being shown broken away.

With reference to the drawings in detail, in which like numerals represent like parts throughout the several views, the reference numeral 10 designates generally a harvester thresher having a housing 12 provided with a straw discharge outlet 14 (FIGURE 4) at the rearward end of the housing 12.

The present invention provides a straw chopper and blower assembly comprising a casing 16 having both ends open and having an inlet 18 and an outlet 20.

Straw is delivered through the outlet 14 by means of reciprocating tables or screens within the thresher, one such table or screen being shown in FIGURE 4 and being designated by the numeral 22.

Within the casing 16 is a horizontally disposed rotatable shaft 24 having its end supported in bearings 26 which are mounted within a frame 28 forming part of the casing 16.

One end portion of the shaft 24 is exteriorly of the casing 16 and carries thereon the pulley 30 over which travels a belt 32 for connecting the pulley 30 to the rotative mechanism or power source of the thresher 10.

A horizontally disposed plate 34 is disposed so as to close an opening in the bottom of the casing 16 and a plurality of upright teeth 36 rise from the plate 34. Holes 38 adjacent the ends of the plate 34 permit the plate 34 to be secured by bolts 40 to the casing 16.

The teeth 36 are triangular in cross sectional configuration and are disposed on the plate 34 so that one sharp edge of the tooth 36 faces in the direction away from the outlet 20 of the casing 16.

Arranged in spaced relation along the shaft 24 are a plurality of elongated plates 42 each having its mid-part provided with a hole through which extends the shaft 24, each of the plates being welded or otherwise fixedly secured to the shaft 24.

Each plate 42 is disposed with its face facing the ends of the shaft 24. Each plate 42 also tapers from its mid-part to its end.

On each of the plates 42, except the endmost plates 42, is a blade 44 disposed transversely of the part of the plate 42 on each side of the shaft 24.

Each of the blades 44 is secured along its longitudinal center line, by welding or other means, to one edge of the plate 42, one of the blades 44 being on one edge of the plate 42 and the other blades being on the other edge of the plate 42. Each of the blades 44 is flat and extends from the part of the plate 42 adjacent the shaft 24 to a point inwardly of and spaced from the free end of the plate 42.

The portions of the plates 42 adjacent their ends cooperate with the upstanding abutment piece 36 to break the straw that is blown through the casing 16 from the inlet to the outlet.

The endmost plates 42 have other blades 46 arranged at an angle so as to form a fan, this structure being shown most clearly in FIGURE 5.

Conduit means is provided having one end connecting in communication with the casing outlet 20 and having the other end adapted to be directed into a place of storage for the chopped straw delivered from the casing 16. This means consists in a wide conduit 48 having one end connecting in communication with the casing 16 (FIGURE 1) and having the other end open and supported upon rods 50 and 52 which project rearwardly from a thresher 10. The rods 50 and 52 are adjustable so as to raise or lower the end portion of the conduit 48 as desired.

A flexible coupling 54 connects the conduit 48 with a curved outlet conduit portion 56 formed integrally with the casing 16 and disposed about the outlet 20.

In addition to receiving straw from the screen 22 through the straw discharge outlet 14 of the thresher 10, chaff is delivered to the casing 16 through a conduit 58 leading from the separator part of the thresher and entering the casing 16 forwardly of the abutment teeth 36.

In use, the belt 32 operatively connects the shaft 24 to the driving mechanism of the thresher 10 and rotates the blades and plates 42 in the counter-clockwise direction as used in FIGURES 1 and 4. This serves to chop the straw as it is delivered into the casing 16, the end portions of the plates 42 cooperating with the teeth 36 to break the straw and separate it.

The endmost plates 42 with their angularly disposed blades 46 serve as fans to draw air into the casing 16 through the open ends thereof, this air serving to carry the broken and chopped straw out through the conduit 48 to a wagon or truck traveling along with the thresher 10, the wagon or truck not being shown and not being a part of the present invention. Preferably, the conduit 48 is provided on its upper end with an extension collar member 60 bolted thereto by means of bolts 62 and forming a means by which the conduit 48 may be elongated for delivering straw to the truck or wagon.

While only a preferred form of the invention is shown and described, other embodiments of the invention are contemplated and numerous changes or modifications may be made in the invention without departing from the spirit thereof as set forth in the appended claim.

What is claimed is:

In combination with a harvester thresher including a source of rotatable power and a housing having a straw discharge outlet, a straw chopper and blower comprising a casing having both ends open and having an inlet and outlet, said casing being secured to said thresher housing with the inlet thereof connected in communication with the straw discharge outlet of said housing, a horizontally disposed rotatable shaft journaled in said casing between said casing inlet and said casing outlet, means operatively connecting said shaft to said power source, a plurality of elongated plates arranged in spaced relation along said shaft, each of said plates being disposed with its faces facing the ends of said shaft, the mid-part of each of said plates being fixedly secured to said shaft, each of said plates other than the two endmost plates having a flat blade disposed transversely of the part of said plate on each side of said shaft, one of said blades being secured along its longitudinal center line to one edge of said plate, and the other of said blades being secured along its longitudinal center line to the opposite edge of said plate, said endmost plates each having a blade disposed at an angle to the part of said plate on each side of said shaft, one of the last mentioned blades being secured along its edge to one edge of said plate and the other last mentioned blades being secured along its edge to the other edge of said plate to thereby provide a fan, a plurality of abutment teeth in said casing in cooperating relation with respect to the free end portions of said plates for chopping straw therebetween, and conduit means having one end connecting in communication with said casing outlet and having the other end adapted to be directed into a place of storage for chopped straw.

References Cited in the file of this patent

UNITED STATES PATENTS

| | | |
|---|---|---|
| 117,812 | Pratt | Aug. 8, 1871 |
| 2,731,995 | Sutherland et al. | Jan. 24, 1956 |
| 2,932,145 | Scranton | Apr. 12, 1960 |
| 3,005,637 | Hetteen | Oct. 24, 1961 |

FOREIGN PATENTS

| | | |
|---|---|---|
| 116,171 | Australia | Nov. 18, 1942 |